United States Patent
Geile

(10) Patent No.: US 9,331,885 B2
(45) Date of Patent: May 3, 2016

(54) MODULATION WITH FUNDAMENTAL GROUP

(71) Applicant: Raytheon BBN Technologies Corp., Cambridge, MA (US)

(72) Inventor: Michael Joseph Geile, Bastavia, OH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 50 days.

(21) Appl. No.: 13/909,213

(22) Filed: Jun. 4, 2013

(65) Prior Publication Data

US 2014/0355716 A1 Dec. 4, 2014

(51) Int. Cl.
*H04L 27/36* (2006.01)
*H04L 27/34* (2006.01)

(52) U.S. Cl.
CPC .................................. *H04L 27/3444* (2013.01)

(58) Field of Classification Search
USPC .......................................... 375/295, 260, 298
See application file for complete search history.

(56) References Cited

U.S. PATENT DOCUMENTS

| 2004/0264592 A1* | 12/2004 | Sibecas et al. ................ 375/267 |
| 2007/0071122 A1* | 3/2007 | Ling et al. ..................... 375/260 |
| 2007/0258602 A1* | 11/2007 | Vepsalainen et al. ......... 381/104 |

FOREIGN PATENT DOCUMENTS

WO    WO 2012119178 A1 *  9/2012

* cited by examiner

*Primary Examiner* — Dac Ha
*Assistant Examiner* — Janice Tieu
(74) *Attorney, Agent, or Firm* — Schwegman Lundberg & Woessner, P.A.

(57) ABSTRACT

Embodiments of a system and method for providing fundamental group modulation are generally described herein. In some embodiments, a trajectory mapper is arranged to receive a modulation symbol sequence. A signal trajectory sample memory is arranged to store a representation of signal trajectories for a topological space having a set of predetermined removed regions therein. The trajectory mapper accesses the signal trajectory sample memory to select a signal trajectory relative to the set of predetermined removed regions in the topological space based on the received modulation symbol sequence and produces a sequence of in-phase (I) and quadrature (Q) sample values at a specified sample rate in response to the selected signal trajectory, the I and Q sample values serving as a basis for an amplified radio frequency signal.

17 Claims, 10 Drawing Sheets

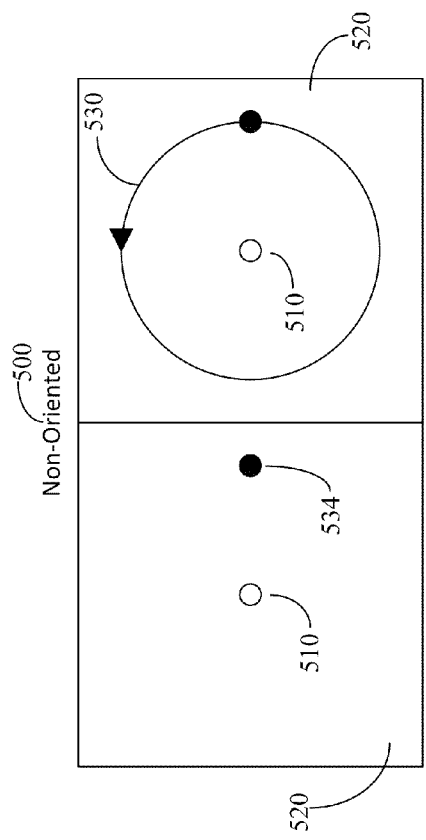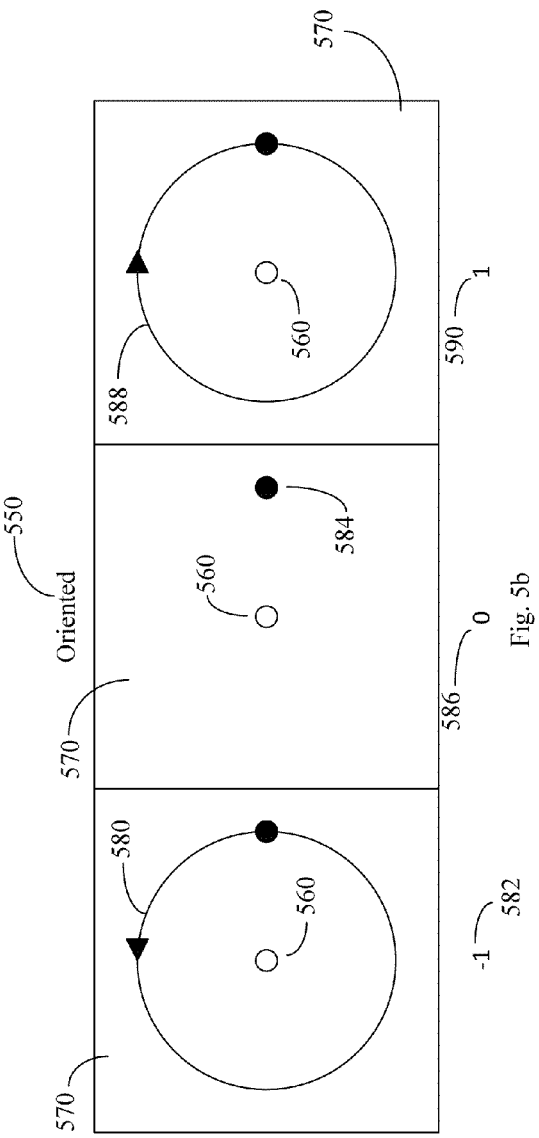
Fig. 5a
Fig. 5b

| $d_2$ | $d_1$ | $d_{-1}$ | $3^2$ | $3^1$ | $3^0$ | Value |
|---|---|---|---|---|---|---|
| -1 | -1 | -1 | 0 | 0 | 0 | 0 |
| -1 | -1 | 0 | 0 | 0 | 1 | 1 |
| -1 | -1 | 1 | 0 | 0 | 2 | 2 |
| -1 | 0 | -1 | 0 | 1 | 0 | 3 |
| -1 | 0 | 0 | 0 | 1 | 1 | 4 |
| -1 | 0 | 1 | 0 | 1 | 2 | 5 |
| -1 | 1 | -1 | 0 | 2 | 0 | 6 |
| -1 | 1 | 0 | 0 | 2 | 1 | 7 |
| -1 | 1 | 1 | 0 | 2 | 2 | 8 |
| 0 | -1 | -1 | 1 | 0 | 0 | 9 |
| 0 | -1 | 0 | 1 | 0 | 1 | 10 |
| 0 | -1 | 1 | 1 | 0 | 2 | 11 |
| 0 | 0 | -1 | 1 | 1 | 0 | 12 |
| 0 | 0 | 0 | 1 | 1 | 1 | 13 |
| 0 | 0 | 1 | 1 | 1 | 2 | 14 |
| 0 | 1 | -1 | 1 | 2 | 0 | 15 |
| 0 | 1 | 0 | 1 | 2 | 1 | 16 |
| 0 | 1 | 1 | 2 | 2 | 2 | 17 |
| 1 | -1 | -1 | 2 | 0 | 0 | 18 |
| 1 | -1 | 0 | 2 | 0 | 1 | 19 |
| 1 | -1 | 1 | 2 | 0 | 2 | 20 |
| 1 | 0 | -1 | 2 | 1 | 0 | 21 |
| 1 | 0 | 0 | 2 | 1 | 1 | 22 |
| 1 | 0 | 1 | 2 | 1 | 2 | 23 |
| 1 | 1 | -1 | 2 | 2 | 0 | 24 |
| 1 | 1 | 0 | 2 | 2 | 1 | 25 |
| 1 | 1 | 1 | 2 | 2 | 2 | 26 |

Fig. 10

MODULATION WITH FUNDAMENTAL GROUP

BACKGROUND

Telecommunication systems are widely deployed to provide various telecommunication services. A communications system may be characterized as a collection of transmitters, receivers, and communications channels that send messages to one another. The transmission of a raw electrical signal, i.e., baseband signal, has several limitations, including bandwidth limitations, distance limitations, etc. To address these issues, many different modulation techniques have been developed. Modulation involves encoding a baseband source signal $S_m(t)$ onto a carrier signal. The carrier waveform is then varied in a manner directly related to the baseband signal.

The move to digital modulation provides more information capacity, compatibility with digital data services, higher data security, better quality communications, and quicker system availability. Digital modulation converts information-bearing discrete-time symbols into a continuous-time waveform. The choice of digital modulation scheme will significantly affect the characteristics, performance and resulting physical realization of a communication system. Traditional linear modulation systems map collections of data bits to a point in a two-dimensional space, $\mathbb{R}^2$, e.g., binary phase shift keying (BPSK), quadrature phase shift keying (QPSK), 16-state quadrature amplitude modulation (16-QAM). For example, relatively simple modulation such as QPSK offers excellent bit error rate (BER) performance at relatively low signal strengths. QPSK however uses a large bandwidth. 16-QAM is more bandwidth efficient, but requires on stronger signal strength than QAM to achieve a low BER. This is particularly so for the more dense bandwidth schemes such as 64-state QAM (64-QAM).

There are three characteristics of a signal that are typically changed over time: amplitude, phase, or frequency. Note that phase and frequency are related. Amplitude and phase can be modulated simultaneously and independently. Such signals can also be represented by in-phase (I) and Quadrature (Q) components, which are the rectangular representation of the polar signals. It is common for digital modulations to map the data to a number of discrete points on the I/Q (complex) plane. These are known as constellation points.

Between symbol clock transitions, the carrier is modulated by an amplitude and phase or, equivalently, an I and Q value that maps to a constellation point in the complex plane. A constellation point encodes a specific data sequence, which includes one or more data bits. A constellation diagram shows the valid locations (i.e., the magnitude and phase relative to the carrier) for permitted symbols. To demodulate the incoming data, the exact magnitude and phase of the received signal is estimated. The layout of the constellation diagram and its ideal symbol locations is determined generically by the chosen modulation format.

Modulation symbols are used to represent information, wherein a symbol may represent one bit or a number of bits. In a symbol period, a digital modulator maps bits to a transmitted waveform from a pre-defined set of possible waveforms, wherein a waveform corresponds to an information symbol. However, existing modulation systems operate in the complex plane or $R^2$. These systems do not rely on the topological of alternative spaces or path relative to such a space to directly carry information.

BRIEF DESCRIPTION OF THE DRAWINGS

FIGS. 5a-b show a comparison of non-oriented and oriented one-ternary symbols according to an embodiment;

FIG. 10 illustrates a table of values for the possible rotations when 3 holes are provided in the topological space with path orientation according to an embodiment;

DETAILED DESCRIPTION

A fundamental group is an algebraic group on equivalence classes associated with a topological space wherein any two paths that start and end at a fixed base point and, that can be continuously deformed into each other are considered members of the same equivalence class. A fundamental group records information about the basic shape, or holes, in a topological space. Fundamental group modulation may be applied to wireless or wired communications. Fundamental group modulation is also applicable to a user (links) or networks. Fundamental group modulations involves modulation of a data sequence on a carrier by transmitting paths relative to a set of removed regions or "holes" $\{d_n\}$ in a topological space. A topological space is defined by the sets the space contains and a specific set of relations between the sets. In topological terms, Fundamental Group Modulation assigns some subset of the fundamental group of a topology to carries information. Fundamental group modulation is not limited to 2-dimensional space ($\mathbb{R}^2$), but is extensible to $\mathbb{R}^n$. Fundamental group modulation may be used to also apply information assignment to the direction (orientation) that a path is traversed about a given $d_n$.

Figure 1:
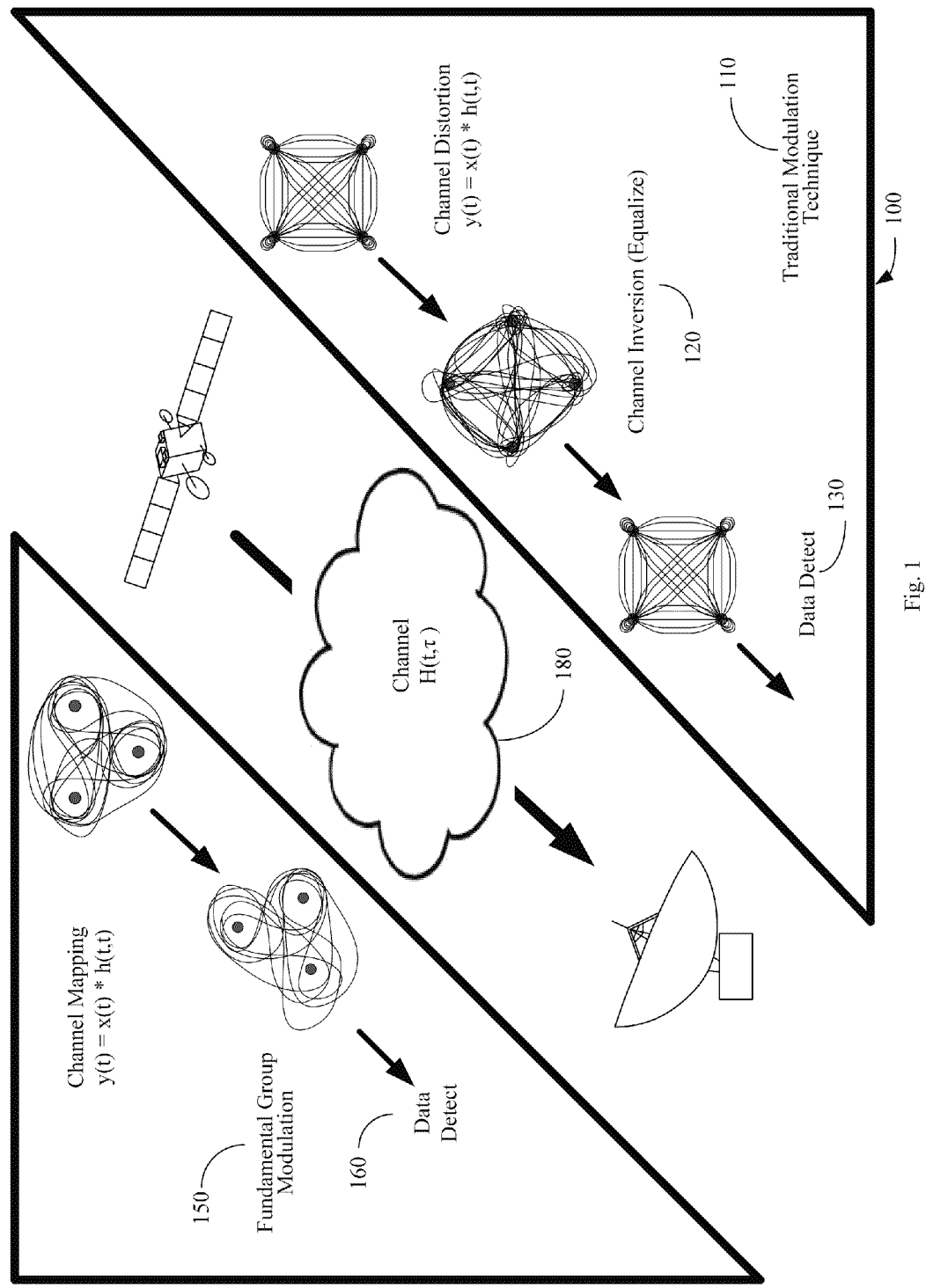
FIG. 1 shows a comparison between fundamental group modulation, according to an embodiment, and traditional modulations techniques.

FIG. 1 shows a comparison 100 between fundamental group modulation according to an embodiment and traditional modulations techniques. As shown in FIG. 1, traditional techniques 110 attempt to mathematical invert 120 the channel effects prior to detection 130, e.g., equalization. However, fundamental group modulation 150 directly detects 160 information in the image space, i.e., a map of the original modulation space mapped through the channel operator. Through direct detection of information in the image space, fundamental group modulation 150 may improve communications through channel distortion 180, improve stability for mobile wireless networked communications, increase communications responsiveness due to higher data efficiencies over longer ranges and less re-routing through the network connections and increase information density per packet.

Figure 2:
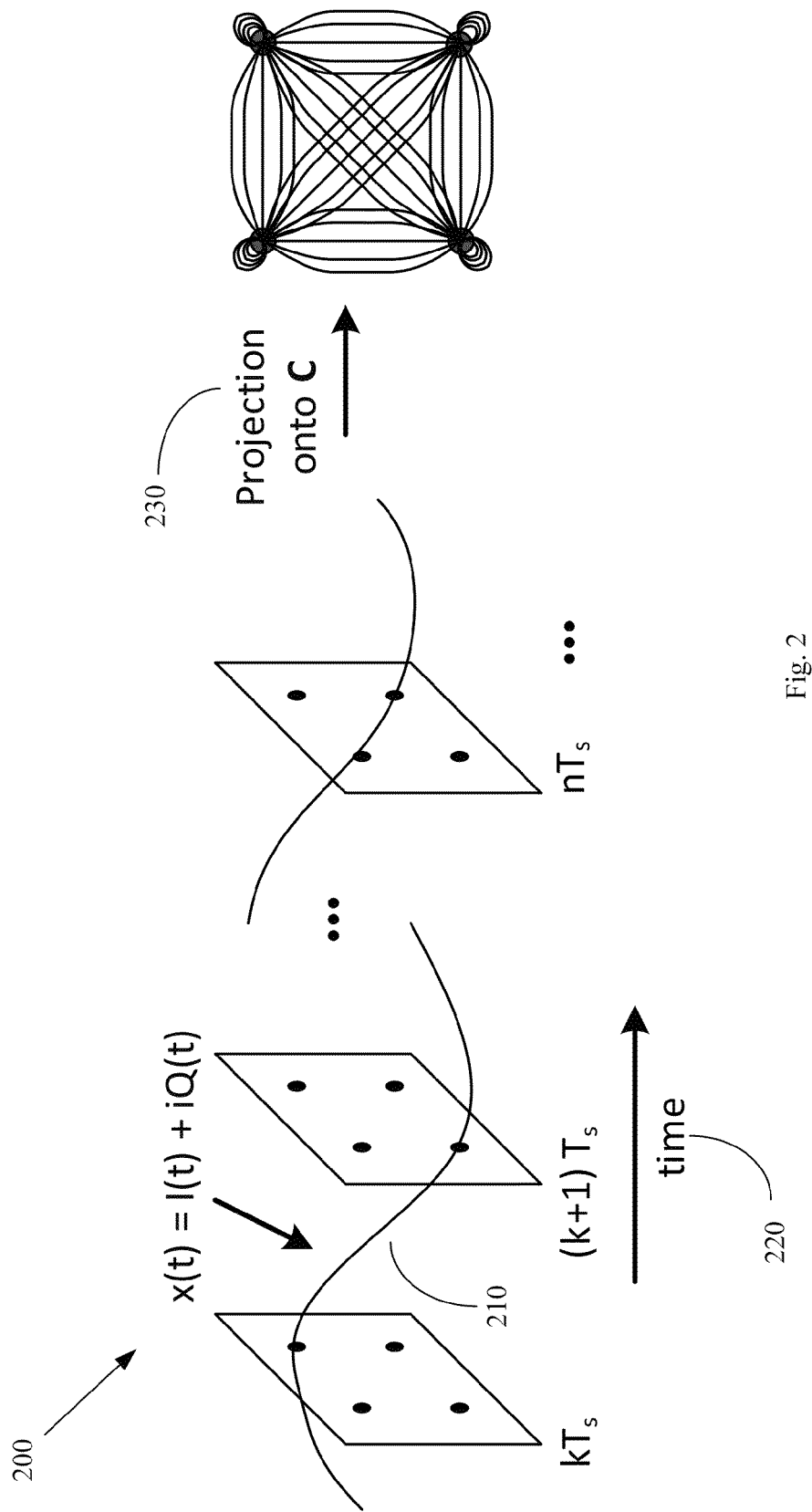
FIG. 2 illustrates an example of a traditional modulation technique.

FIG. 2 illustrates an example of traditional modulation technique 200. As shown in FIG. 2, a 4QAM (QPSK) system transmits a path in a subset of C×R, i.e., the Cartesian product of the complex plane with the real line, by sending a continuous complex signal trajectory 210 over time 220. FIG. 2 shows the modulation as a path in C×R projected into a constellation/trajectory in C 230. Thus, existing digital modulation techniques map information to a point on a complex signal trajectory or constellation 230. Channel impairments are addressed through mathematical correction, i.e., equalization, which balances modulation symbol distortion for corruption by noise or interference sources.

The channel may be viewed as an operator, F(•), where y(t)=F(x(t)) with x(t) the transmit signal and y(t) the signal at the RF front end. F(•) is typically characterized as convolution with a time-varying function. Additive Gaussian noise imparted by the RF front end corrupts the signal that is then processed for detection. The signal is sampled and processed to acquire unknown frequency and timing offsets so that the detector can recover an estimate of the modulated stream. Accordingly, receiver noise corrupts the transmitted signal's trajectory. In the example cases, the demodulator's n detectors determine whether the path encircles the puncture point once or not (non-oriented) and in which direction (oriented).

Figure 3A:
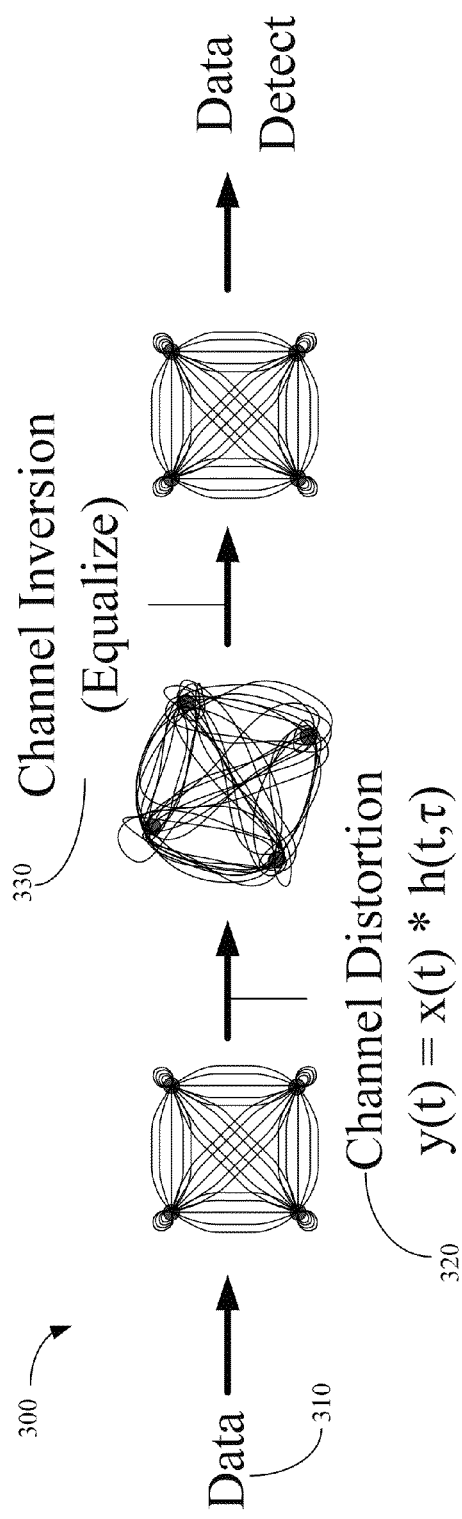
FIGS. 3a-b illustrates graphs showing fundamental group modulation and detection according to an embodiment and traditional modulation and detection.
Figure 3B:
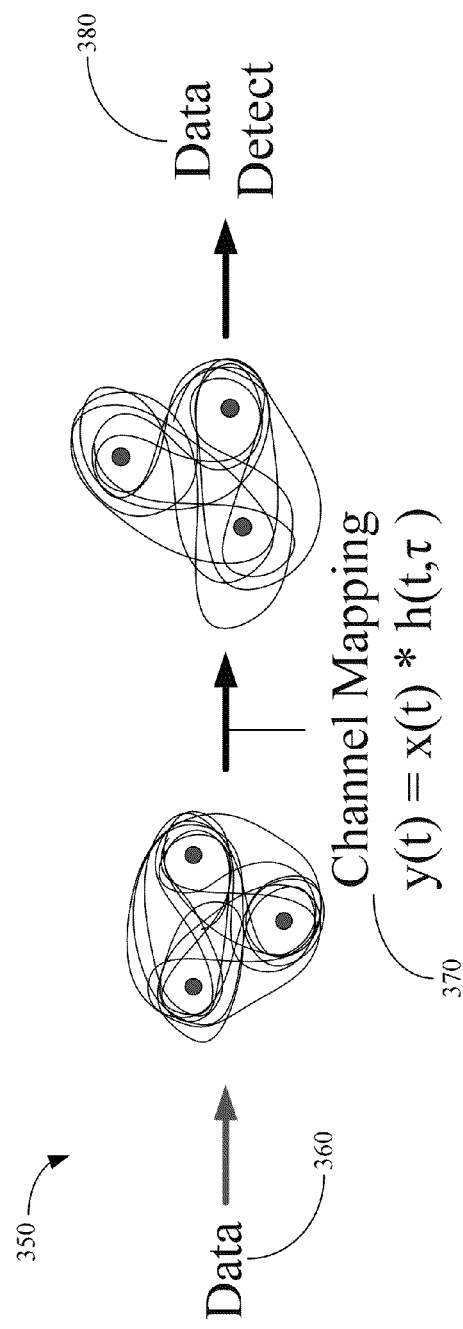

FIGS. 3a-b illustrates graphs 300, 350 showing fundamental group modulation and detection according to an embodiment and traditional modulation and detection. FIG. 3a illustrates a traditional system 300 receiving data 310 that treats the channel as a distortion function 320 and attempts to invert the distortion 330. Traditional systems, whether single carrier, multi-carrier OFDM, or continuous phase modulation (CPM), apply an equalizer 330 that attempts to mathematically invert the channel effects. Single carrier and CPM systems essentially approximate deconvolution while OFDM systems leverage a cyclic waveform property. Traditional systems address interference in two ways. Some systems estimate the interference and then perform linear cancellation. This is useful in the sense that it removes the source of degradation. Equalization 330 reduces the interference by minimizing an error metric, e.g., mean-square error, and this balances the distortion caused by the channel and interference to attempt data recovery. FIG. 3b illustrates fundamental group modulation performing detection of the signal directly in the image space of the channel function. Input data 360 is directly mapped 370 to detect the data 380.

Figure 4:
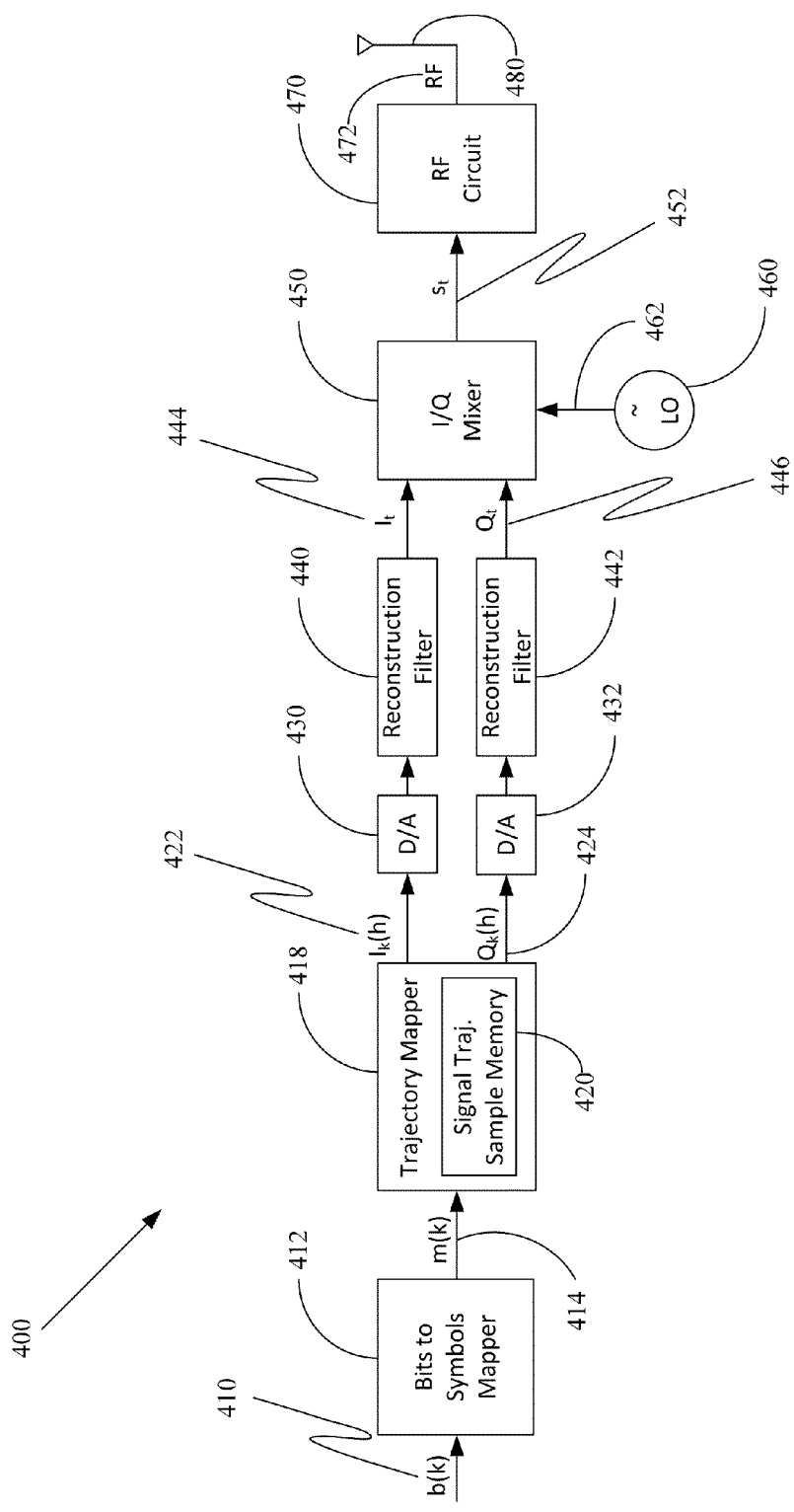
FIG. 4 shows a fundamental group modulator according to an embodiment.

FIG. 4 shows a fundamental group modulator 400 according to an embodiment. In FIG. 1, a data bit sequence b(k) 410 enters a bits-to-symbol map 412, wherein the data bit sequence b(k) 410, binary information, is mapped to symbols to produce a modulation symbol sequence m(k) 414. For the case where the fundamental group is applied for some $\{d_n\}$, there are $2^n$ possible distinct equivalences determined by inclusion of the holes. The $2^n$ possible distinct equivalences are the same as the cardinality (set size) of the power set of $\{d_n\}$. If fundamental groups with orientation are applied, a rotation of −1, 0, +1 may be achieved so the natural information map is ternary. Therefore, there are $3^n$ possible distinct equivalence classes of paths with orientation.

The modulation symbol sequence m(k) 414 is provided to signal trajectory mapper 418, wherein the trajectory mapper 418 accesses a signal trajectory sample memory 420 to select a signal trajectory. The signal trajectory sample memory 420 includes a stored representation of the possible signal trajectories. In another embodiment, an algorithm may be used to form either digital or analog trajectories. The trajectory mapper 418 using the signal trajectory memory 420 produces a sequence of in-phase (I) and quadrature (Q) sample values $I_k(n)$ 422 and $Q_k(n)$ 424 at a specified sample rate in response to the modulation symbol sequence m(k) 414. The in-phase and quadrature sample values, $I_k(n)$ 422 and $Q_k(n)$ 424, are provided to digital-to-analog (D/A) converters 430, 432. The D/A converters 430, 432 accept a discrete sample value (e.g., $base_2$ number) in and produces a baseband analog signal representation at the output. The in-phase and quadrature sample values, $I_k(n)$ 422 and $Q_k(n)$ 424, are provided at a selected sample rate.

The signal out of the D/A converters 430, 432 are provided to analog reconstruction filters 440, 442. The signal from the D/A converters 430, 432 includes harmonic content, which is attenuated by the analog reconstruction filters 440, 442. The in-phase I(t) 444 and quadrature Q(t) 446 waveforms provided at the output of the analog reconstruction filters 440, 442 are provided to an I/Q mixer 450 where the in-phase I(t) 444 and quadrature Q(t) 446 waveforms are mixed with a radio frequency (RF) signal 462 established by a local oscillator (LO) 460. For example, the LO signal is given by:

$c(t)=\cos(\omega_c t)$ with $\omega_c=2\pi f_c$ and $f_c=100$ Mhz.

The output of the I/Q mixer 450 is then given by:

$$s(t)=I(t)\cos \omega_c t - Q(t)\sin \omega_c t,$$

where $$I(t)=r(t)\cos(\theta(t)) \text{ and } Q(t)=r(t)\sin(\theta(t)).$$

with:

$$r(t) = \sqrt{I(t)^2 + Q(t)^2} \text{ and}$$

$$\theta(t) = \tan^{-1}\left(\frac{Q(t)}{I(t)}\right).$$

Note that $s(t)=r(t)\cos(\omega_c t+\theta(t))$.

An RF circuit 470 may be applied to convert the output of the I/Q mixer 450, s(t) 452, to an amplified final RF frequency signal 472. In a wireless application, an antenna 480 is used to radiate the final amplified RF signal 472 in the form of electromagnetic energy.

Accordingly, the bits-to-symbols mapper 412 is used to map binary values to $base_2$, $base_3$, etc. modulation symbols. However, modulation symbols may be directly supplied to the signal trajectory sample memory 420. The signal trajectory sample memory 420 is used to define the signal trajectories that will be transmitted. The components of a communication system according to an embodiment share an understanding of the underlying topological space and, specifically, the "holes" $\{d_n\}$ in the space that the paths encircle. Further, the fundamental group modulator 400 operates in the original complex space mapped through the channel function when the channel map is a local homeomorphism so that the image space over the constraint set has the same topology as the original space. Therefore, fundamental groups are preserved, i.e., if a loop went about a point in the original space then it also does so in the image space. However, embodiment may include admissible channel operators besides homeomorphisms.

The bits-to-symbols mapper 412, the trajectory mapper 418 and/or the signal trajectory sample memory 420 may be realized in a microprocessor, a field programmable array (FPGA), an application specific integrated circuit (ASIC), etc. The trajectory mapper 418 and/or signal trajectory sample memory 420 may be realized as an analog circuit that produces trajectories at an RF frequency directly.

A topology is defined as a collection of points and sets, i.e., a "space" that has certain properties. Two spaces are considered topologically identical if they can be related through a homeomorphism, i.e., a continuous map that has a continuous inverse. Algebraic topology introduces the notion of a fundamental group by observing when two loops in a space that have a common, fixed starting and ending base point can be continuously deformed into each other. Intuitively, the fundamental group records information about the holes of a topological space. Any closed paths relative to a base point that can be continuously deformed into each other are considered equivalent, i.e., classes. The classes are the elements of the group. Equivalent (homeomorphic) topological spaces have the same fundamental groups. The basis of the proposed fundamental group modulator 400 is that a topology is an invariant under a homeomorphic (channel) transformation and so is the fundamental group. Therefore, the distinction between classes of loops in the modulation space is preserved at the detector—even when the channel evolves. The elements of the group are invariant between the domain and image space of the channel operator. In contrast, systems that communicate via constellation points selected from the complex plane may exhibit points that substantially vary as the channel changes.

Herein, simple topologies are determined by puncturing holes in a region of the complex plane and extending the concept to higher dimensional spaces. The notation $C\backslash\{a, b, \ldots z\}$ is used to refer to the complex plane that is missing the points in the set $\{a, b, \ldots z\}$, i.e., the points are punctured from the space. Elements of a group that loop around points by rotation clock-wise (−1), no rotation (0), and counter-clockwise (1), i.e., negative, zero, and positive oriented loops respectively, are used.

The modulation trajectories are generated with a traditional quadrature structure that establishes a trajectory in the complex plane. The demodulator measures the rotation about each of the k punctures in the plane. The k detectors compute a winding number by approximating the Cauchy integral of the detected path, g(t), about the punctured point $z_0$ as:

$$n(\gamma, z_0) = \frac{1}{2\pi i} \int_\gamma \frac{d\varsigma}{\varsigma - z_0}$$

Therefore, the demodulator samples the received path sufficiently to approximate this integral over a path that is known to be closed at the transmitter. Acquisition recovers and corrects for frequency error as in traditional systems. Timing acquisition acquires the modulation base point so that integration is accomplished relative to the original closed path as viewed in the channel's image space.

FIGS. 5a-b show a comparison of non-oriented 500 and oriented 550 one-ternary symbols according to an embodiment. FIGS. 5a-b show spaces $C\backslash\{a\}$ that have a single punctured point 510, 560. FIG. 5a illustrates that on the complex plane, $C\backslash\{a\}$ 520, the system sends one bit non-oriented per symbol. FIG. 5b illustrates that on the complex plane, $C\backslash\{a\}$ 570, the system sends one ternary symbol (1.6 bits) oriented per symbol. In general, a non-oriented system with k punctures can carry k bits because the set of trajectories has the same cardinality as the power set of the puncture points, i.e., ($2^k$). An oriented system carriers $\log_2(3^k)$ bits and the mapping is more readily represented in terms of ternary symbols rather than binary digits (bits).

In FIGS. 5a-b, the space 520 contains a single point hole in $\mathbb{R}^2$ at (0,0). So $d_0=(0,0)$, i.e., the point hole, wherein $d_0$ 510, 560 is marked in each. In FIG. 5a, if the path 530 encircles $d_0$ 510, a binary 1 532 is sent. If the path 534 does not encircle $d_0$ 510, a 0 536 is sent. A bit of information is transmitted with one specified point $d_0$. Power of the transmission can be varied with no impact to a detector that measures rotation about the point to recover the information.

In FIG. 5b, modulation again has n=1, except here path orientation is included. There are three states so $3^1$ values may be sent or equivalently $\log_2(3) \cong 1.6$ bits of information. In the oriented one-ternary symbol system 550, if the path encircles $d_0$ in a counter-clockwise direction 580, a binary −1 582 is sent, if the path does not encircle $d_0$ 584, a 0 586 is sent, and if the path encircles $d_0$ in a clockwise direction 588, a binary 1 590 is sent.

Figure 6:
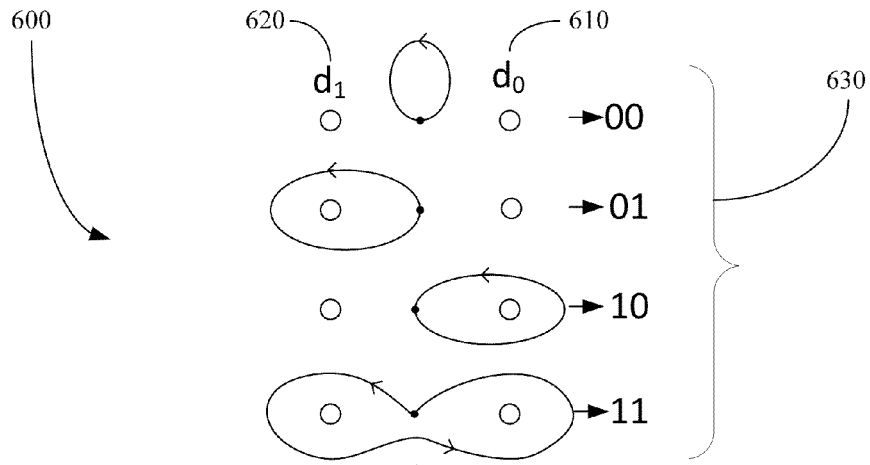
FIG. 6 illustrates modulation with n=2 and no orientation is provided according to an embodiment.

FIG. 6 illustrates modulation with n=2 and no orientation 600 is provided according to an embodiment. In FIG. 6, the system sends two bits per non-oriented per symbol on the punctured complex plane, $C\backslash\{a,b\}$. In FIG. 6, $\mathbb{R}^2$ is punctured at $d_0=(1,0)$ 610 and $d_1=(-1,0)$ 620. The paths will encircle these points. Thus, FIG. 6 shows four possible paths or signal trajectories 630 that may be transmitted. The data rate and bandwidth are determined by the rate that the closed paths are completed. In another embodiment, different paths may be completed at different rates which, for example, may be used to reduce the bandwidth of the signal. The structure of the topology is shared at the transmitter and receiver, i.e., where the holes are. If synchronized, the topology could be altered as a form of transmission security to protect the information.

Figure 7:
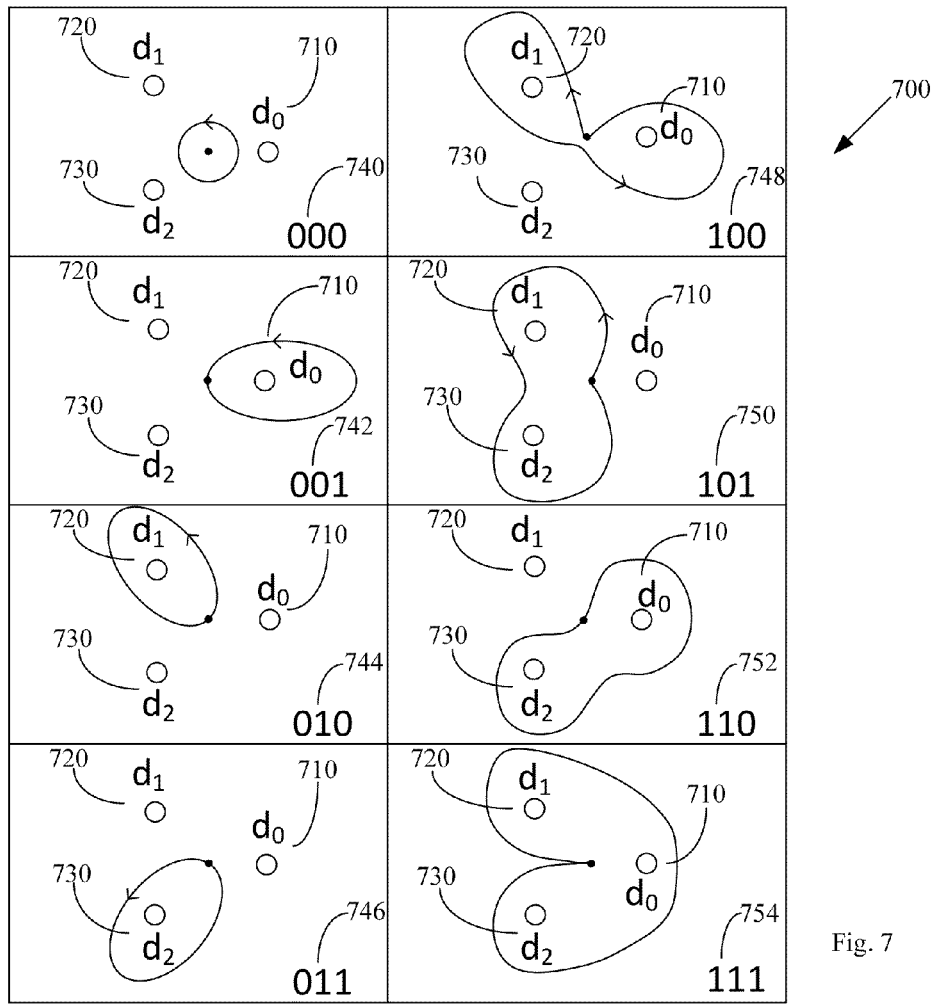
FIG. 7 illustrates paths for modulation using three symbols according to an embodiment.

FIG. 7 illustrates paths for modulation using three symbols 700 according to an embodiment. In FIG. 7, the system sends three bits non-oriented per symbol on the complex plane, $C\backslash\{a,b,c\}$. In FIG. 7, $\mathbb{R}^2$ is punctured at the points ($d_0$ 710, $d_1$ 720, $d_2$ 730), which given in polar coordinates in terms of magnitude and angle are $$\left(1\angle 0, 1\angle\frac{2\pi}{3}, 1\angle\frac{4\pi}{3}\right).$$

Thus, when the path does not encircle $d_0$ 710, $d_1$ 720, $d_2$ 730, 000 is sent 740. When only $d_0$ 710 is encircled, 001 is sent 742. When only $d_1$ 720 is encircled, 010 is sent 744. When only $d_2$ 730 is encircled, 011 is sent 746. When only $d_0$ 710 and $d_1$ 720 are encircled, 100 is sent 748. When only $d_1$ 720 and $d_2$ 730 are encircled, 101 is sent 750. When only $d_0$ 710 and $d_2$ 730 are encircled, 110 is sent 752. When $d_0$ 710, $d_1$ 720, $d_2$ 730 are all encircled, 111 is sent 754.

Figure 8:
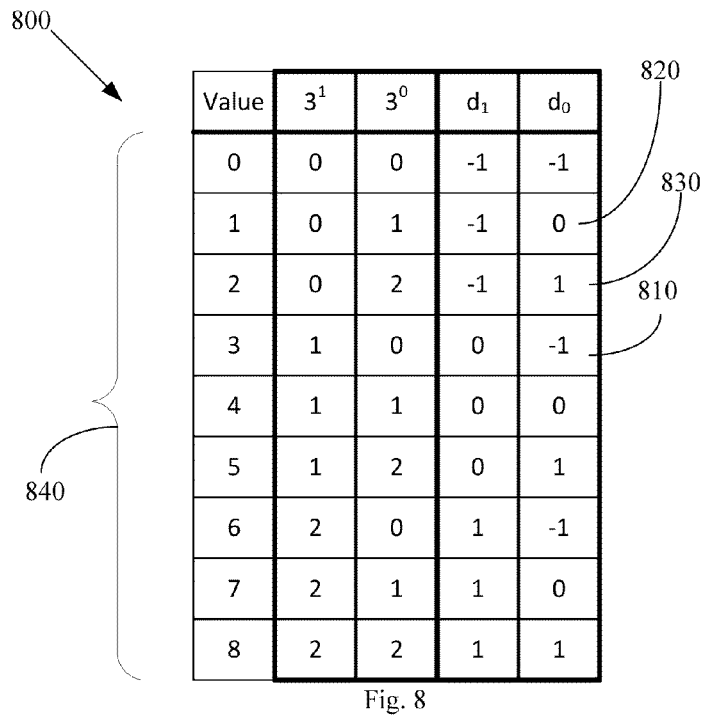
FIG. 8 illustrates a matrix of values for the oriented paths for $d_0$ and $d_1$ as $\{-1, 0, 1\}$ according to an embodiment.

FIG. 8 illustrates a matrix of values 800 for the oriented paths for $d_0$ and $d_1$ as $\{-1, 0, 1\}$ according to an embodiment. In FIG. 8, −1 810 represents a negative oriented closed path, 0 830 represents no closed path, and 1 820 represents a positive oriented closed path. In FIG. 8, the system sends two ternary symbol (3.2 bits) oriented per symbol on the complex plane, $C\backslash\{a,b\}$. The space used has n=2 to now provide $3^2=9$ possible trajectories 840, i.e., $\log_2 9=3.17$ bits may be sent for each symbol.

Figure 9:
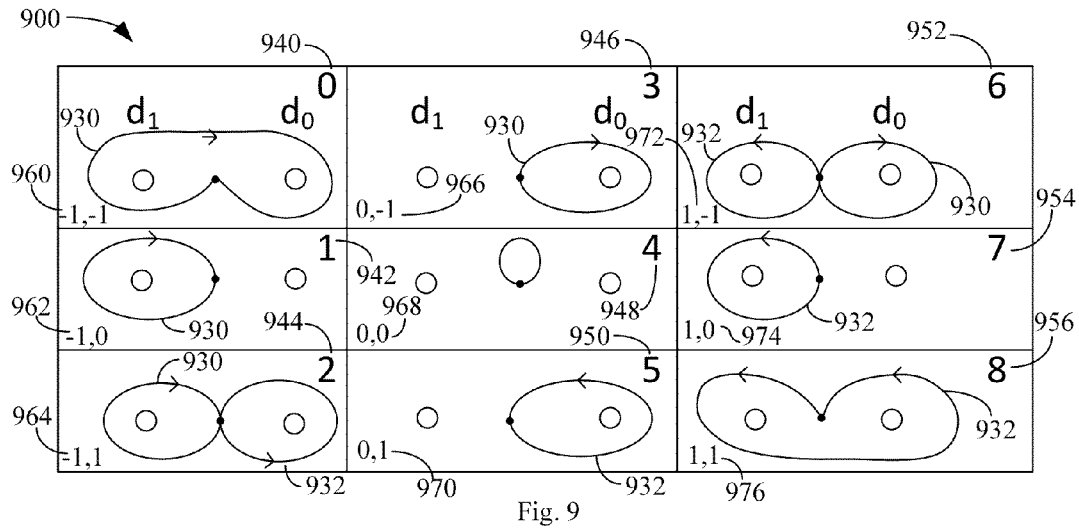
FIG. 9 illustrates the paths on the complex plane, $C\backslash\{a,b\}$, when the system sends oriented paths communicating two ternary values per symbol according to an embodiment.

FIG. 9 illustrates the paths on the complex plane, $C\backslash\{a,b\}$ when the system sends two bits oriented per symbol 900 according to an embodiment. In FIG. 9, state 0 940 represents a path encircling both $d_0$ and $d_1$ in a clockwise direction 930, wherein −1, −1 is sent 960. State 1 942, a path only encircles $d_1$, wherein −1, 0 is sent 962. In state 2 944, a path encircles $d_0$ in a clockwise direction 930 and a path encircles $d_1$ in a counter-clockwise direction 932, wherein −1, 1 is sent 964. In State 3 946, a path only encircles $d_0$ in a clockwise direction 930, wherein 0, −1 is sent 966. In state 4 948, a path does not encircle either $d_0$ or $d_1$, wherein 0, 0 is sent 968. In state 5 950, only $d_0$ is encircled in a counter-clockwise direction 932, wherein 0, 1 is sent 970. In state 6 952, $d_0$ is encircled in a clockwise direction and $d_1$ is encircled in a counter-clockwise direction 932, wherein 1, 1 is sent 972. In state 7 954, only $d_1$ is encircled in a counter-clockwise direction 932, wherein 1, 0 is sent 974. In state 8 956, both $d_0$ and $d_1$ are encircled in a counter-clockwise direction 932, wherein 1, 1 is sent 976.

FIG. 10 illustrates a matrix of values 1000 for the possible rotations when 3 holes are provided in the topological space with path orientation according to an embodiment. In FIG. 10, the holes are designated $d_0$ 1010, $d_1$ 1012, and $d_2$ 1014, and may have the values $\{-1, 0, 1\}$. A negative oriented closed path is represented by −1, 0 represents no closed path around a hole, and 1 represents a positive oriented closed paths. To the right of the values for $d_0$ 1010, $d_1$ 1012, and $d_2$ 1014, the base$_3$ values are shown. The equivalent base$_{10}$ values then illustrated. Thus, the three oriented bits provide $3^3=27$ possible oriented signal path trajectories, which provide $\log_2(27)=3 \log_2(3)=4.75$ bits per trajectory.

Figure 11:
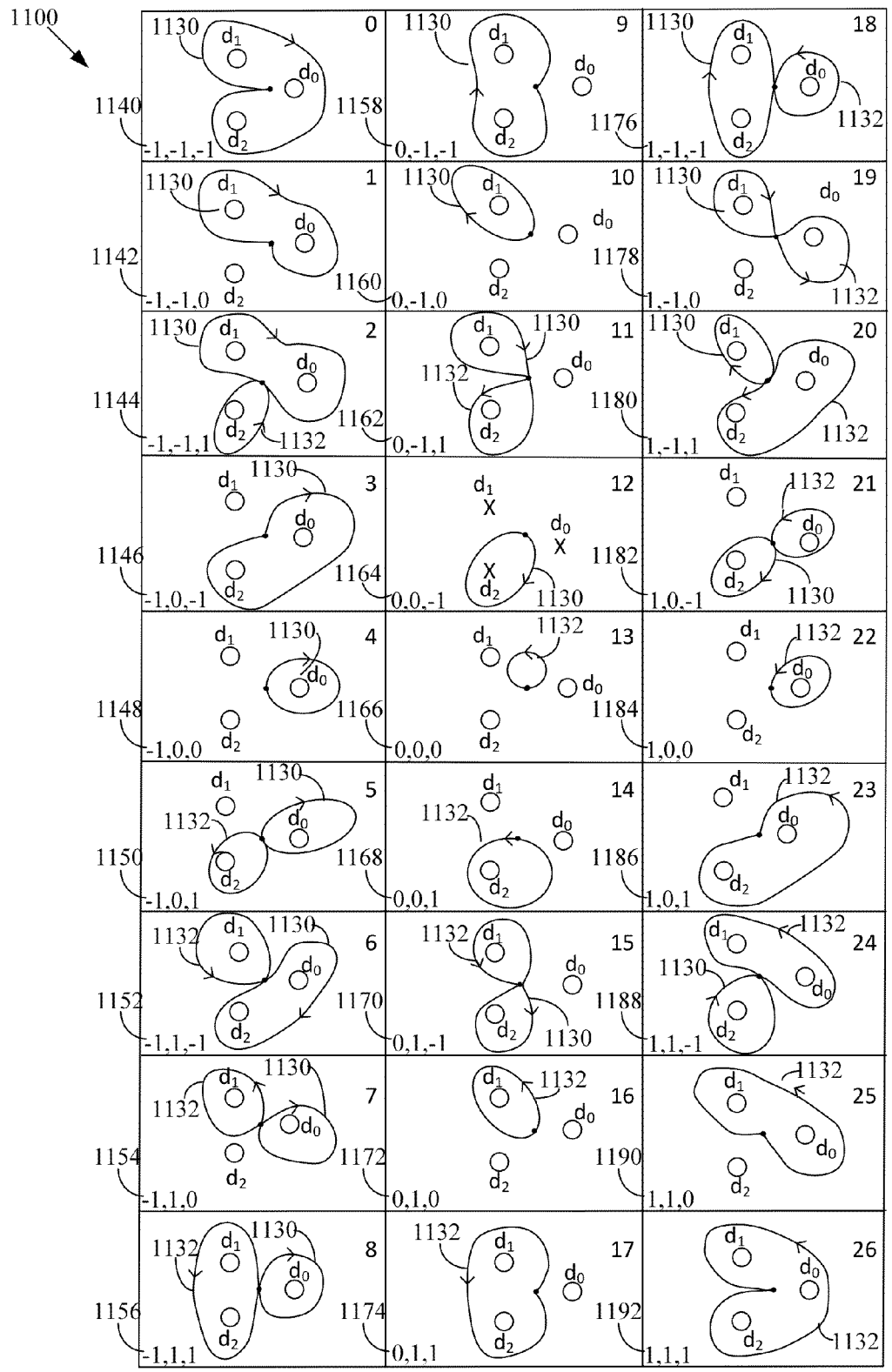
FIG. 11 illustrates example oriented paths on the complex plane, $C\backslash\{a, b, c\}$, when the system sends three bits oriented per symbol according to an embodiment.

FIG. 11 illustrates the paths on the punctured complex plane, $\mathbb{C}\backslash\{a, b, c\}$, when the system sends three bits oriented per symbol 1100 according to an embodiment. As described above with reference to FIG. 10, the three oriented bits provide $3^3=27$ possible oriented signal path trajectories. In FIG. 11, $\mathbb{R}^2$ is punctured at the points $(d_0, d_1, d_2)$, which given in polar coordinates in terms of magnitude and angle are $$\left(1\angle 0,\ 1\angle \frac{2\pi}{3},\ 1\angle \frac{4\pi}{3}\right).$$

Thus, when the path circles $d_0$, $d_1$, and $d_2$, in a clockwise pattern 1130, the values −1, −1, −1 are sent 1140. The other paths and corresponding patterns are described below:

When the path only circles $d_0$ and $d_1$ in a clockwise pattern 1130, the values −1, −1, 0 are sent 1142.

When the path circles $d_0$, and $d_1$ in a clockwise pattern 1130 and circles $d_2$ in a counter-clockwise direction 1132, the values −1, −1, 1 are sent 1144.

When the path only circles $d_0$ and $d_2$ in a clockwise pattern 1130, the values −1, 0, −1 are sent 1146.

When the path only circles $d_0$ in a clockwise pattern 1130, the values −1, 0, 0 are sent 1148.

When the path circles $d_0$ in a clockwise direction and circles $d_2$ in a counter-clockwise pattern 1132, the values −1, 0, 1 are sent 1150.

When the path circles $d_0$ and $d_2$ in a clockwise pattern 1130 and circles $d_1$ in a counter-clockwise direction 1132, the values −1, 1, −1 are sent 1152.

When the path circles $d_0$ in a clockwise direction and circles $d_1$ in a counter-clockwise pattern 1132, the values −1, 1, 0 are sent 1154.

When the path circles $d_1$ and $d_2$ in a counter-clockwise pattern 1132 and circles $d_0$ in a clockwise direction, the values −1, 1, 1 are sent 1156.

When the path only circles $d_1$ and $d_2$ in a clockwise pattern 1130, the values 0, −1, −1 are sent 1158.

When the path only circles $d_1$ in a clockwise pattern 1130, the values 0, −1, 0 are sent 1160.

When the path circles $d_1$ in a clockwise direction and circles $d_2$ in a counter-clockwise pattern 1132, the values 0, −1, 1 are sent 1162.

When the path only circles $d_2$ in a clockwise pattern 1130, the values 0, 0, −1 are sent 1164.

When the path does not circle $d_0$, $d_1$, or $d_2$, the values 0, 0, 0 are sent 1166.

When the path only circles $d_2$ in a counter-clockwise pattern 1132, the values 0, 0, 1 are sent 1168.

When the path circles $d_1$ in a counter-clockwise direction 1132 and circles $d_2$ in a clockwise pattern 1130, the values 0, 1, −1 are sent 1170.

When the path only circles $d_1$ in a counter-clockwise pattern 1132, the values 0, 1, 0 are sent 1172.

When the path only circles d1 and $d_2$ in a counter-clockwise pattern 1132, the values 0, 1, 1 are sent 1174.

When the path circles $d_1$ and $d_2$ in a clockwise pattern 1130 and circles $d_0$ in a counter-clockwise direction 1132, the values 1, −1, −1 are sent 1176.

When the path circles $d_0$ in a counter-clockwise direction 1132 and circles $d_1$ in a clockwise pattern 1130, the values 1, −1, 0 are sent 1178.

When the path circles $d_0$ and $d_2$ in a counter-clockwise pattern 1132 and circles $d_1$ in a clockwise direction, the values 1, −1, 1 are sent 1180.

When the path circles $d_0$ in a counter-clockwise direction 1132 and circles $d_2$ in a clockwise pattern 1130, the values 1, 0, −1 are sent 1182.

When the path only circles $d_0$ in a counter-clockwise pattern 1132, the values 1, 0, 0 are sent 1184.

When the path only circles $d_0$ and $d_2$ in a counter-clockwise pattern 1132, the values 1, 0, 1 are sent 1186.

When the path circles $d_0$, and $d_1$ in a counter-clockwise pattern 1132 and circles $d_2$ in a clockwise direction, the values 1, 1, −1 are sent 1188.

When the path only circles $d_0$ and $d_1$ in a counter-clockwise pattern 1132, the values 1, 1, 0 are sent 1190.

When the path circles $d_0$, $d_1$, and $d_2$, in a counter-clockwise pattern 1132, the values 1, 1, 1 are sent 1192.

Figure 12:
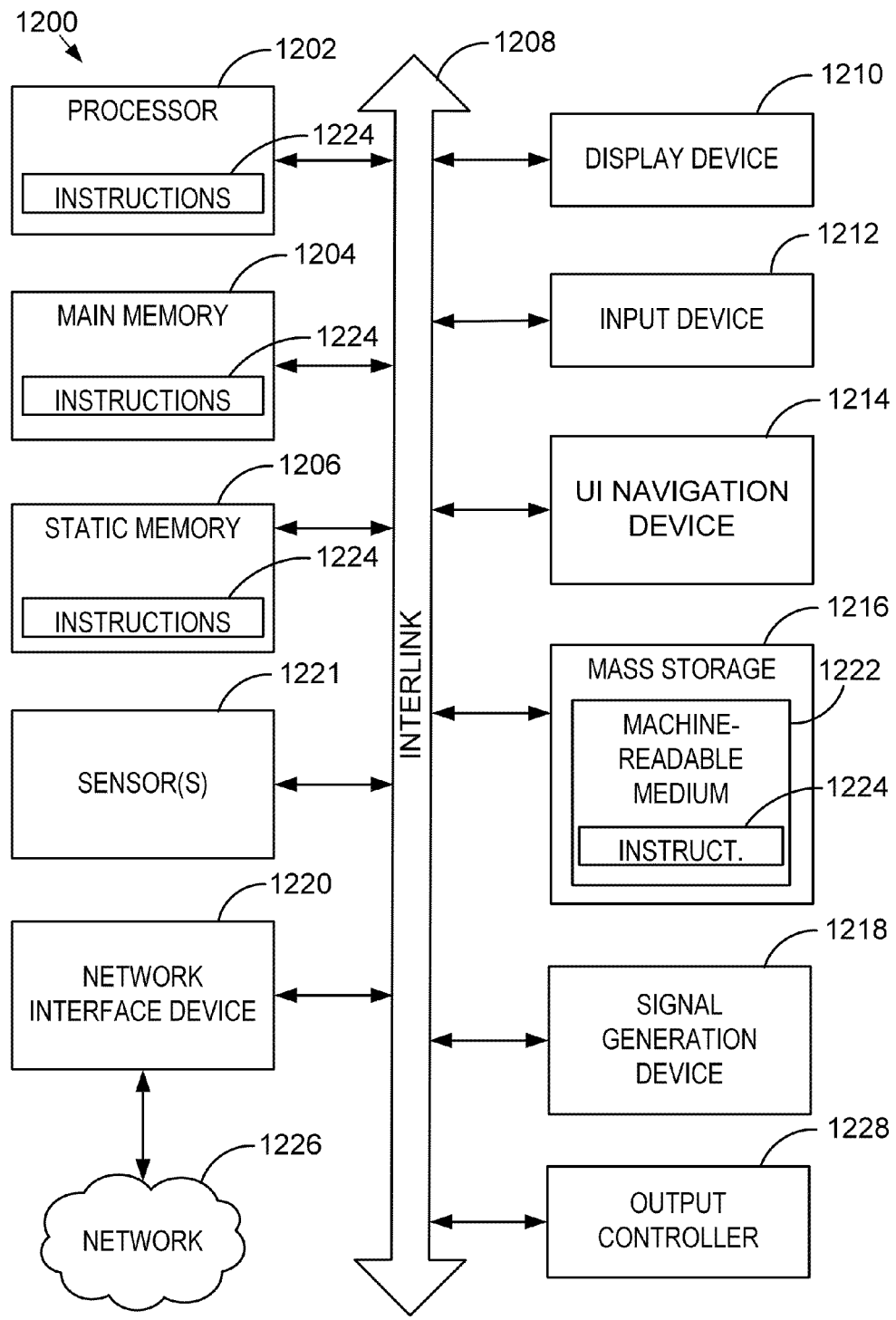
FIG. 12 illustrates a block diagram of an example machine for modulation with fundamental group according to an embodiment.

FIG. 12 illustrates a block diagram of an example machine 1200 for modulation with fundamental group according to an embodiment upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine and/or a client machine in server-client network environments. In an example, the machine 1200 may act as a peer machine in peer-to-peer (P2P) (or other distributed) network environment. The machine 1200 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1202 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1202 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, at least some of which may communicate with others via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e g, infrared (IR)) connection to communicate or control one or more peripheral devices (e.g., a printer, card reader, etc.).

The storage device 1216 may include at least one machine readable medium 1222 on which is stored one or more sets of data structures or instructions 1224 (e.g., software) embodying or utilized by any one or more of the techniques or functions described herein. The instructions 1224 may also reside, at least partially, additional machine readable memories such as main memory 1204, static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) that configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols. Example communication networks may include a local area network (LAN), a wide area network (WAN), a packet data network (e.g., the Internet), mobile telephone networks or other networks now known or later developed.

For example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Table 1 provides a comparison of proposed fundamental group modulation with traditional linear and non-linear modulation methods. Table 1 demonstrates the significant differences between common linear and non-linear modulation methods compared to fundamental group modulation. The primary difference is that a topology is assumed at the modulator and elements of the fundamental group, as defined later, bear the information. The channel is viewed as an operator on the original topological space and the group elements are invariant between transmit and receive spaces when the channel has a local (homeomorphic) mathematical property. Therefore, it is feasible to detect information in the channel's image space without inverting the effects of the channel, i.e., without equalization.

TABLE 1

| Characteristic | M-QAM/ OFDM | CPM | FG Mod |
|---|---|---|---|
| Information Structure in C | Constellations | Phase trajectories | Loops around holes in a topological space |

TABLE 1-continued

| Characteristic | M-QAM/ OFDM | CPM | FG Mod |
|---|---|---|---|
| Detection | Coherent/ Differential | Coherent with trellis demodulation | Coherent or non-coherent with contour integral. |
| Modulation Space | C | $S^1$ | n-dimensional topological spaces |
| Spectral Efficiency (bps/Hz) | $\log_2(M)$ | <2.5 | Non-linear modulation - Open |
| Bits per distinguished point in space | $\log_2(M)$ | fractional | k (non-oriented), $\log_2(3^k)$ (oriented) |
| Detection efficiency dependency | Distance between constellation points | Distance between trellis trajectories | Distance between elements in fundamental groups |
| Power Amplification | 6 bps/Hz uses about 5.7 dB backoff for QAM and about 10 dB for OFDM. | No backoff since on unit circle. | Varies by space chosen - Open. |
| Error Correction Coding | Spread redundancy over D × R | Spread redundancy over $S^1$ × R | Spread redundancy over chosen n-dimensional topological space × R. |
| Recovery in channel distortion | Equalization | Equalization | Direct detection image space |
| Interference | Equalization or cancelation | Equalization or cancellation | Cancellation |
| Detection Space | Same as modulation space | Same as modulation space | Image of modulation space through channel |

R = real line,
C = complex plane,
$S^1$ = unit circle,
D is the unit disk,
M = number of constellation points,
k = number of punctures in C,
D × R = Cartesian product of unit disk and R,
$S^1$ × R = Cartesian product of unit circle and R.

Fundamental group modulation may be used to reduce complexity, provide greater data rates, and increase resilience for many systems through a scintillating channel or for terrestrial communications through multipath. Fundamental group modulation may be applied to wired or wireless communications. A single user may modulate with the space or subsets of the space may be assigned to multiple users. For example, for n=3, each of $d_1$, $d_2$, $d_3$ may be assigned to different users and the information from each coded in either a non-distinguished or distinguished orientation. Subgroups may be similarly applied. Data sequences are associated with fundamental groups. Hence signal paths may vary within these equivalence classes. While examples herein have shown modulations with paths in $\mathbb{R}^2$, paths in other topological spaces may also be achieved. For example, if two orthogonal carriers are used we can modulate on a space in $\mathbb{R}^4 = S^1 \times S^1$ ($S^1$ is a circle in $\mathbb{R}^2$, x is the product operator on a space). $S^1 \times S^1$ is referred to as a torus. Hence, the system may apply to modulation on higher dimensional topological spaces. This notion also includes the use of multiple transmitters that produces a path on some space, which may be useful for transmission through saturated amplifiers or operation in a linear region of an amplifier. Further, as mentioned above, information may be assigned to path that respect orientation or may not respect orientation, symbol directions and rate of movement may be varied in a given implementation and the topological space may be varied over time, wherein nodes communicating share an understanding of the underlying space associated with the paths used to modulate the information. In the case where the channel effects the holes, e.g., morphs the topology, the holes may be identified over the medium by sending such information to identify at the receiver where holes are in the topological space.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A fundamental group modulator, comprising:
   a trajectory mapper arranged to receive a modulation symbol sequence; and
   a signal trajectory sample memory, arranged to store a representation of signal trajectories for a topological space having a set of predetermined removed regions therein;
   wherein the trajectory mapper accesses the signal trajectory sample memory to select a signal trajectory relative to the set of predetermined removed regions in the topological space based on the received modulation symbol sequence and produces a sequence of in-phase (I) and quadrature (Q) sample values at a specified sample rate in response to the selected signal trajectory, the I and Q sample values serving as a basis for an amplified radio frequency signal, wherein a fundamental group is applied to n punctured points, $d_n$, in the topological space to produce $2^n$ distinct equivalence classes of signal trajectories without orientation, wherein n is a positive integer.

2. The fundamental group modulator of claim 1 further comprising a bits-to-symbols mapper, coupled to the trajectory mapper, the bits-to-symbols mapper arranged to receive a data bit sequence and to map binary values to modulation symbols based on the received data bit sequence.

3. A fundamental group modulator, comprising:
   a trajectory mapper arranged to receive a modulation symbol sequence; and
   a signal trajectory sample memory, arranged to store a representation of signal trajectories for a topological space having a set of predetermined removed regions therein;
   wherein the trajectory mapper accesses the signal trajectory sample memory to select a signal trajectory relative to the set of predetermined removed regions in the topological space based on the received modulation symbol sequence and produces a sequence of in-phase (I) and quadrature (Q) sample values at a specified sample rate in response to the selected signal trajectory, the I and Q sample values serving as a basis for an amplified radio frequency signal, wherein a fundamental group is applied to n punctured points, $d_n$, in the topological space to produce $3^n$ distinct equivalence classes of signal trajectories without orientation, wherein n is a positive integer.

4. The fundamental group modulator of claim 3, wherein the trajectory mapper includes an algorithm arranged to form the representation of signal trajectories stored in the signal trajectory sample memory.

5. The fundamental group modulator of claim 3 further comprising a first digital-to-analog converter and a second digital-to-analog converter, wherein the first digital-to-analog converter is arranged to receive in-phase sample value from the trajectory mapper to produces a baseband analog in-phase signal representation at an output of the first digital-to-analog converter and the second digital-to-analog converter is arranged to receive quadrature sample value from the trajectory mapper to produces a baseband analog quadrature signal representation at an output of the first digital-to-analog (D/A) converter.

6. The fundamental group modulator of claim 5 further comprising a first analog reconstruction filter and a second analog reconstruction filter, the first analog reconstruction filter arranged to receive the baseband analog in-phase signal representation and the second analog reconstruction filter arranged to receive the baseband analog quadrature signal representation, the first analog reconstruction filter arranged to attenuate harmonic content from the baseband analog in-phase signal representation and the second analog reconstruction filter arranged to attenuate harmonic content from the baseband analog quadrature signal representation to produce in-phase and quadrature waveforms at an output of the first and second analog reconstruction filters respectively.

7. The fundamental group modulator of claim 6 further comprising an in-phase/quadrature (I/Q) mixer for mixing the in-phase and quadrature waveforms with a radio frequency signal to produce a modulated radio frequency signal.

8. The fundamental group modulator of claim 7 further comprising a local oscillator for producing the radio frequency signal provided to the I/Q mixer.

9. The fundamental group modulator of claim 8 further comprising an RF circuit arranged to convert the output of the I/Q mixer to the amplified radio frequency signal.

10. A method for providing fundamental group modulation, comprising:
    receiving a modulation symbol sequence at a trajectory mapper;
    accessing a signal trajectory sample memory to select a signal trajectory relative to a set of removed regions in a topological space based on the received modulation symbol sequence by determining the topological space by selecting a complex plane and puncturing at least one hole in a region of the complex plane; and
    transmitting a radio frequency (RF) signal based on the selected signal trajectory.

11. The method of claim 10, wherein the receiving the modulation symbol sequence further comprises receiving, at a bits-to-symbol map, a data bit sequence and mapping the data bit sequence to symbols to produce the modulation symbol sequence.

12. The method of claim 10, wherein the transmitting the radio frequency (RF) signal based on the selected signal trajectory further comprises producing a sequence of in-phase (I) and quadrature (Q) sample values at a specified sample rate in response to the selected signal trajectory.

13. The method of claim 12 further comprising:
    receiving, at a first and second digital-to-analog (D/A) converter, the in-phase and quadrature sample values and producing a baseband analog signal representation of the in-phase and quadrature sample values;
    receiving, at a first and second analog reconstruction filter, the baseband analog signal representation of the in-phase and quadrature sample values and attenuating harmonic content to provide filtered in-phase and quadrature waveforms;
    receiving, at an I/Q mixer, the in-phase and quadrature waveforms and mixing the in-phase and quadrature waveforms with a carrier signal to produce a radio frequency signal; and
    receiving, at an RF circuit, the radio frequency signal and amplifying the radio frequency signal to produce an amplified final RF frequency signal for transmission.

14. The method of claim 10, wherein the determining the topological space by selecting a complex plane further comprises selecting a complex plane in n dimensional space.

15. At least one non-transitory machine readable medium comprising instructions that, when executed by the machine, cause the machine to perform operations for providing fundamental group modulation, the operations comprising:
    receiving a modulation symbol sequence at a trajectory mapper;
    accessing a signal trajectory sample memory to select a signal trajectory relative to a set of removed regions in a topological space based on the received modulation symbol sequence by applying a fundamental group to n punctured points, $d_n$, in the topological space to produce $2^n$ distinct equivalence classes of signal trajectories without orientation, wherein n is a positive integer; and transmitting a radio frequency (RF) signal based on the selected signal trajectory.

16. The at least one non-transitory machine readable medium of claim 15 further comprising:

receiving, at a bits-to-symbol map, a data bit sequence and mapping the data bit sequence to symbols to produce the modulation symbol sequence;

producing a sequence of in-phase (I) and quadrature (Q) sample values at a specified sample rate in response to the selected signal trajectory; and converting the in-phase (I) and quadrature (Q) sample values to the RF signal.

17. At least one non-transitory machine readable medium comprising instructions that, when executed by the machine, cause the machine to perform operations for providing fundamental group modulation, the operations comprising:

receiving a modulation symbol sequence at a trajectory mapper;

accessing a signal trajectory sample memory to select a signal trajectory relative to a set of removed regions in a topological space based on the received modulation symbol sequence by applying a fundamental group to n punctured points, $d_n$, in the topological space to produce $3^n$ distinct equivalence classes of signal trajectories with orientation, wherein n is a positive integer; and transmitting a radio frequency (RF) signal based on the selected signal trajectory.

* * * * *